(12) United States Patent
Reynolds et al.

(10) Patent No.: US 10,549,646 B2
(45) Date of Patent: Feb. 4, 2020

(54) GROUND TREATMENT APPLIANCE

(71) Applicant: Robert Bosch GmbH, Stuttgart (DE)

(72) Inventors: David Reynolds, Edmunds (GB);
Gavin Ben Armstrong, Tostock Suffork (GB); Martin Bolton, Suffolk (GB);
Philip Tonks, Suffolk (GB); Thomas Eagling, Attleborough (GB)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 15/636,953

(22) Filed: Jun. 29, 2017

(65) Prior Publication Data
US 2018/0001786 A1 Jan. 4, 2018

(30) Foreign Application Priority Data
Jun. 30, 2016 (DE) .................. 10 2016 211 842

(51) Int. Cl.
| | |
|---|---|
| *G06F 19/00* | (2018.01) |
| *B60L 15/20* | (2006.01) |
| *A01D 34/00* | (2006.01) |
| *A01D 34/01* | (2006.01) |
| *G05D 1/02* | (2006.01) |
| *A01D 75/00* | (2006.01) |
| *A01D 101/00* | (2006.01) |

(52) U.S. Cl.
CPC ............ *B60L 15/20* (2013.01); *A01D 34/008* (2013.01); *A01D 34/01* (2013.01); *G05D 1/0272* (2013.01); *A01D 34/00* (2013.01); *A01D 75/00* (2013.01); *A01D 2101/00* (2013.01)

(58) Field of Classification Search
CPC .. A01D 2101/00; A01D 34/00; A01D 34/008; A01D 34/01; A01D 75/00; B60L 15/20; B60L 2200/14; B60L 2260/32; G05D 1/0272; Y02T 10/7258
See application file for complete search history.

(56) References Cited

U.S. PATENT DOCUMENTS

| | | | |
|---|---|---|---|
| 3,950,986 A * | 4/1976 | Parkinson | G01L 3/1471 73/862.28 |
| 5,204,814 A * | 4/1993 | Noonan | A01D 34/008 180/168 |
| 5,532,605 A * | 7/1996 | Dimmick | G01B 7/087 209/527 |
| 10,206,519 B1 * | 2/2019 | Gyori | A47F 1/126 |
| 2002/0108891 A1 * | 8/2002 | Dunlop | G07D 7/04 209/534 |

(Continued)

FOREIGN PATENT DOCUMENTS

| | | |
|---|---|---|
| DE | 691 29 407 T2 | 11/1998 |
| DE | 10 2015 221 128 A1 | 5/2016 |
| WO | 03/103375 A1 | 12/2003 |

*Primary Examiner* — Harry Y Oh
(74) *Attorney, Agent, or Firm* — Maginot, Moore & Beck LLP

(57) ABSTRACT

An autonomous ground treatment appliance, in particular a robotic lawnmower, includes a housing, a running gear, a control unit, at least one wheel unit, and a sensor unit. The control unit is configured to control the autonomous ground treatment appliance. The at least one wheel unit is mounted on the housing so as to be at least partially movable relative to the housing. The sensor unit is configured to ascertain a position of the wheel unit relative to the housing.

15 Claims, 8 Drawing Sheets

(56) References Cited

U.S. PATENT DOCUMENTS

| | | | | |
|---|---|---|---|---|
| 2004/0111184 A1* | 6/2004 | Chiappetta | G05D 1/0225 | 700/245 |
| 2005/0162119 A1* | 7/2005 | Landry | A47L 9/2805 | 318/580 |
| 2007/0016328 A1* | 1/2007 | Ziegler | A47L 5/14 | 700/245 |
| 2007/0179670 A1* | 8/2007 | Chiappetta | G05D 1/0272 | 700/245 |
| 2010/0049364 A1* | 2/2010 | Landry | G05D 1/0272 | 700/245 |
| 2010/0063628 A1* | 3/2010 | Landry | G05D 1/0272 | 700/258 |
| 2012/0226094 A1* | 9/2012 | Ritchey | A61B 17/1707 | 600/12 |
| 2012/0293166 A1* | 11/2012 | Lee | G01D 5/2046 | 324/207.17 |
| 2014/0371975 A1* | 12/2014 | Biber | A01D 34/008 | 701/23 |
| 2015/0180479 A1* | 6/2015 | Pflum | H03K 21/10 | 377/19 |
| 2015/0303708 A1* | 10/2015 | Efe | H01F 27/2804 | 307/104 |
| 2015/0342470 A1* | 12/2015 | Cros | A61B 5/0215 | 29/831 |
| 2017/0361456 A1* | 12/2017 | He | B25J 5/00 | |
| 2018/0172870 A1* | 6/2018 | Jiang | G01V 3/107 | |
| 2018/0304893 A1* | 10/2018 | Hall | B60W 30/18009 | |

* cited by examiner

GROUND TREATMENT APPLIANCE

This application claims priority under 35 U.S.C. § 119 to patent application no. DE 10 2016 211 842.0, filed on Jun. 30, 2016 in Germany, the disclosure of which is incorporated herein by reference in its entirety.

The disclosure relates to a ground treatment appliance.

BACKGROUND

Autonomous ground treatment appliances are generally designed to treat the ground using a treatment unit which is oriented parallel to the ground. By way of example, the blades of the mower mechanism of an autonomous robotic lawnmower are arranged parallel to the ground in order to uniformly cut the lawn. If the ground treatment appliance partly meets an obstacle or a wheel of the ground treatment appliance is on a step, this can lead to the treatment unit moving into an inclined position. Proper operation of the treatment unit cannot be ensured in this inclined position.

SUMMARY

The disclosure relates to a ground treatment appliance which is designed to detect lift-off of at least one wheel from the ground.

The disclosure proceeds from an autonomous ground treatment appliance, in particular a robotic lawnmower, comprising a housing, a running gear, a control unit for controlling the autonomous ground treatment appliance and at least one wheel unit which is arranged on the housing in an at least partially movable manner. It is proposed that the ground treatment appliance has a sensor unit which is designed to ascertain the position of the wheel unit relative to the housing.

Autonomous or at least partially autonomous ground treatment appliances are generally intended to move automatically within a defined working region, without leaving said working region. A wide range of fields of application of autonomous ground treatment appliances are known, for example as autonomous robotic lawnmowers, robotic lawn scarifiers, robotic ground sweepers, robotic snow clearers, robotic cleaners, robotic vacuum cleaners or other service robots. When ground treatment appliances are used outdoors or in other areas that are not delimited by walls, an outer limit of the working region that is to be treated can preferably be defined by an electric boundary conductor.

The housing of the autonomous ground treatment appliance is, in particular, in the form of an external housing which shields the inner components of the autonomous ground treatment appliance to the outside. The housing of the autonomous ground treatment appliance can be of multipartite design, by way of example comprising a housing cover and an underbody which is arranged on the bottom side of the housing.

Here, a "running gear" is intended to be understood to mean, in particular, a unit which is provided for locomotion of the autonomous ground treatment appliance. The running gear preferably has an electrical, mechanical and/or pneumatic motor unit which, during operation, is advantageously provided to generate a rotary movement of at least one drive wheel. The motor unit is particularly preferably in the form of an electric motor. Furthermore, the running gear can comprise, in particular, a drive wheel which is at least partially directly or indirectly connected in a force-fitting manner to the motor unit.

In this context, a "sensor unit" is intended to be understood to mean, in particular, a unit which is provided for detecting at least one characteristic variable, wherein the detection can take place in an active manner, such as in particular by generating and emitting an electrical and/or magnetic measurement signal, and/or in a passive manner, such as in particular by detecting changes in characteristic variables of a signal transmitter. Various sensor units which would appear to be expedient to a person skilled in the art are conceivable. The sensor unit is designed, in particular, in a contact-free manner, wherein contact-free is intended to be understood to mean that the sensor unit does not require any mechanical contact with the signal transmitter.

A "wheel unit" is intended to be understood to mean, in particular, a unit which comprises a locomotion element and is designed to mount the locomotion element on the housing in a movable manner. The locomotion element can, by way of example, be in the form of a drive wheel or a support wheel. In contrast to the drive wheel, the support wheel is not directly driven by a motor unit, but rather follows the movement of the housing, which movement is triggered by the running gear. The locomotion element can be mounted in the wheel unit such that it can rotate. The rotation axis of the locomotion element can advantageously be designed to extend parallel to the rotation axis of the drive wheels. Furthermore, the wheel unit can be mounted on the housing such that it can at least partially rotate about a vertical axis, wherein the vertical axis extends substantially perpendicular to the longitudinal axis of the housing and perpendicular to the rotation axis of the locomotion element. The longitudinal axis of the housing advantageously extends substantially along a straight locomotion direction of the autonomous ground treatment appliance. In particular, the locomotion element is mounted such that it can rotate about the vertical axis. The ability of the wheel unit to rotate about the vertical axis makes it possible to advantageously ensure that the locomotion element can follow a steering movement. At least the locomotion element of the wheel unit is preferably mounted such that it can move, in particular such that it can move in a linear manner, along the vertical axis, as a result of which the position of the wheel unit relative to the housing can advantageously be at least partially changed. In particular, the locomotion element of the wheel unit is mounted in a movable manner relative to the housing between a retracted state and an extended state. A retracted state is intended to be understood to mean, in particular, that the distance between at least the locomotion element and the housing is minimal. An extended state is intended to be understood to mean, in particular, that the distance between at least the locomotion element and the housing is at a maximum. If the autonomous ground treatment appliance is moving on a treatment surface under normal operating conditions, the wheel unit, in particular the locomotion element, is in the retracted state. In particular, the wheel unit is in a retracted state if the locomotion element is in contact with the working surface, and is in an extended state if the locomotion element loses contact with the working surface.

The sensor unit is designed, in particular, to ascertain the position of the locomotion element of the wheel unit relative to the housing. The sensor unit can advantageously be used to ascertain whether the wheel unit, in particular the locomotion element of the wheel unit, is in a retracted or an extended state.

The sensor unit can be arranged at least partially on a printed circuit board, in particular integrated in a printed circuit board. At least one sensor element of the sensor unit is preferably arranged on the printed circuit board, advantageously designed in a manner integrated in the printed circuit board. The printed circuit board is, in particular, plate-like and formed from an electrically insulating material. Furthermore, the printed circuit board comprises conductor tracks which are designed for making electrical contact with electronic components. Owing to the arrangement of at least one component of the sensor unit on the printed circuit board, the number of wires which are required for electrically connecting the components of the sensor unit to one another or for connecting the electrical components of the sensor unit to electrical components of the control unit can advantageously be reduced. "Integrated in a printed circuit board" is intended to be understood to mean, in particular, that the outer surface of a component, such as the outer surface of the sensor element for example, is substantially completely surrounded by the electrically insulating material of the printed circuit board. Additional mechanical protection of the component and sealing-off against dirt and moisture can advantageously be realized by the integration of components into the printed circuit board.

The printed circuit board can be in the form of a component of the control unit. In this context, a "control unit" is intended to be understood to mean, in particular, a unit with an information input, an information processing means and an information output. The control unit advantageously has at least a processor, a memory, an operating program, closed-loop control routines, open-loop control routines and/or calculation routines. The information input is particularly preferably connected to the sensor unit in such a way that a characteristic variable which is detected by the sensor unit can be used in the control unit for the purpose of ascertaining a retracted or an extended state of the wheel unit. The control unit is advantageously designed to deactivate the mower mechanism, in particular the mower mechanism and the running gear, when an extended state of the wheel unit is ascertained. Owing to the arrangement of the control unit and the sensor unit on a printed circuit board, costs and installation space in the housing can advantageously be saved.

The sensor unit can comprise at least one sensor element, wherein the sensor element can, in particular, be in the form of a sensor coil. The sensor coil can have one turn, advantageously a plurality of turns. The sensor coil is formed from an electrically conductive material. The turns of the sensor coil are advantageously arranged along at least one plane of the printed circuit board. The windings of the sensor coil are arranged around a central opening in which a coil former can be partially arranged. The sensor coil is preferably in the form of an air-core coil which does not comprise a coil former or comprises a coil former which is composed of a non-magnetic material. As an alternative, it is also conceivable that the sensor element is in the form of a Hall sensor.

The sensor coil can be in the form of part of a resonant circuit. The sensor coil is interconnected in the sensor unit, in particular, in such a way that the resonant circuit can be excited to perform electromagnetic natural oscillation.

The resonant circuit can comprise an amplifier which is designed to keep the amplitude of the resonant circuit constant. On account of the resistance of the components of the resonant circuit through which current flows, for example the sensor coil, the oscillation of the resonant circuit is damped. In order to keep the amplitude of the resonant circuit, in particular the amplitude of the oscillation of the resonant circuit, constant, a constant energy supply is required, this being realized by the amplifier. The sensor unit is advantageously designed to detect the energy which is required to maintain the constant amplitude of the resonant circuit.

The sensor unit can be designed to ascertain the position of a signal transmitter element. The signal transmitter element is, in particular, in the form of a signal transmitter element which is known to a person skilled in the art and can be provided for influencing the damping of the resonant circuit. In particular, the signal transmitter element can be designed to emit energy to the resonant circuit, or to absorb energy from the resonant circuit. The influence of the signal transmitter element on the damping of the resonant circuit is preferably dependent on the position of the signal transmitter element relative to the sensor unit, in particular relative to the sensor coil.

The sensor coil can be arranged, in particular, concentrically about a recess in the printed circuit board. The area which is formed by the recess in the printed circuit board advantageously overlaps with the area which is formed by the opening of the sensor coil.

The signal transmitter element can be arranged in an at least partially movable manner relative to the recess in the printed circuit board. The signal transmitter element is preferably arranged at least partially in the recess of the printed circuit board. The signal transmitter element can advantageously be arranged in an at least partially movable manner in the opening of the sensor coil.

The signal transmitter element can be in the form of a magnetoresistive element. In this case, a magnetoresistive element is intended to be understood to mean a component which is at least partially formed from a magnetoresistive material. The signal transmitter element is preferably at least partially formed from iron. Owing to the signal transmitter element being in the form of a magnetoresistive element, the damping of the resonant circuit can be influenced in a particularly effective manner.

The signal transmitter element can, in particular, be in the form of a guide rod. The guide rod is formed, in particular, at least partially from an iron-containing material, advantageously from stainless steel. The movement of the guide rod relative to the housing is advantageously coupled to the movement of the locomotion element relative to the housing.

The printed circuit board can have a second sensor unit which is designed to ascertain the position of a further signal transmitter element of a further wheel unit. Owing to the integration of two sensor units for two wheel units, installation space and the number of components can advantageously be further saved.

The ground treatment appliance can have a seal element which is, in particular, integrally formed with the housing, wherein the seal element is designed to protect the sensor unit against moisture. The sensor unit, in particular the sensor coil, and the wheel unit, in particular the signal transmitter element, is advantageously arranged on different sides of the seal element. The seal element can, in particular, be in the form of a separating wall between the interior of the housing and exterior of the housing.

The seal element can have at least one protuberance, wherein the protuberance is arranged, in particular, at least partially in the recess of the printed circuit board. In particular, the seal element can at least partially be in the form of a continuous wall which passes through the recess, wherein the seal element is formed as a protuberance at the position of the recess. The protuberance can advantageously intersect a plane which is defined by the printed circuit board. The signal transmitter element can be formed such that it can move at least partially in the protuberance of the seal element. In particular, the at least partial arrangement of the signal transmitter element in the protuberance can ensure that the signal transmitter element can move into and out of the opening of the sensor coil. The wheel unit is advantageously designed such that it can be fastened to the seal element in such a way that no dirt or moisture can enter the interior of the housing via the moving components of the wheel unit.

BRIEF DESCRIPTION OF THE DRAWINGS

Further advantages can be found in the following description of the drawings. Exemplary embodiments of the disclosure are illustrated in the drawings. The drawing, the description and the claims contain numerous features in combination. A person skilled in the art will expediently also consider the features individually and combine them to form useful further combinations.

In the drawings

FIG. 8b: shows a perspective view of the further alternative embodiment of the sensor unit according to FIG. 8a.

DETAILED DESCRIPTION

Figure 1A:
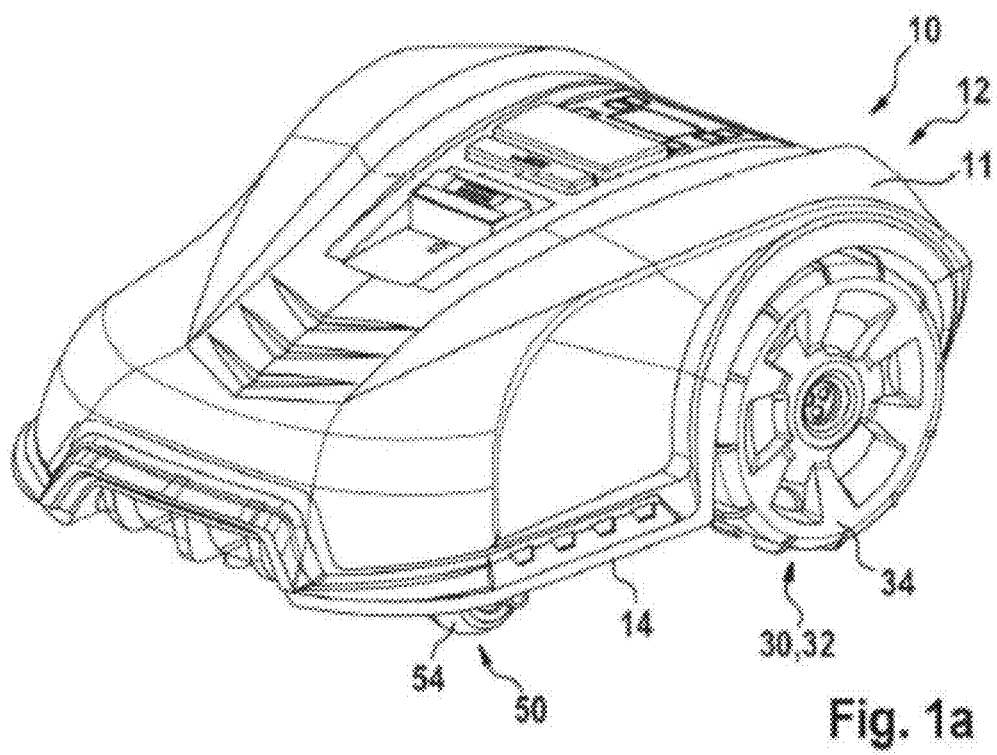
FIG. 1a: shows a perspective view of an autonomous floor treatment appliance.
Figure 1B:
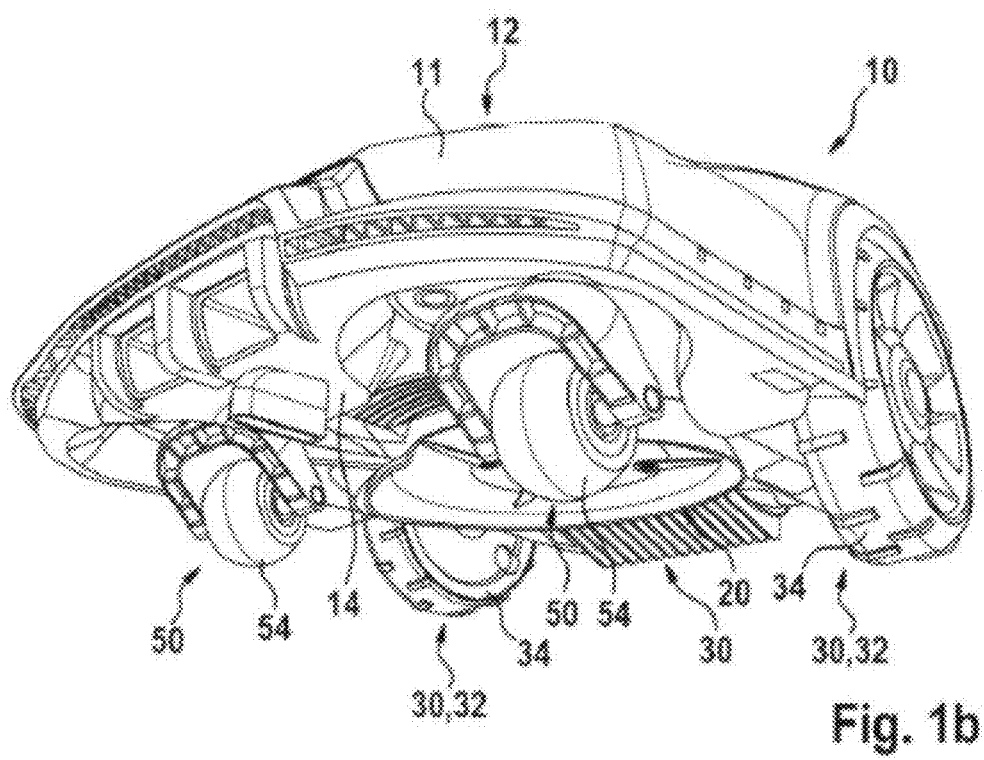
FIG. 1b: shows a perspective view of an autonomous floor treatment appliance.

FIG. 1a shows an autonomous ground treatment appliance 10 which is formed by an autonomous lawnmower which has at least one mower mechanism 20 (see FIG. 1b) which is already known to a person skilled in the art. The autonomous ground treatment appliance 10 comprises at least one running gear 30 which has at least one drive wheel 34, at least one sensor unit 100 and at least one control unit 40. The housing 12 of the autonomous ground treatment appliance 10 comprises, for example, a housing cover 11 and an underbody 14.

Figure 2:
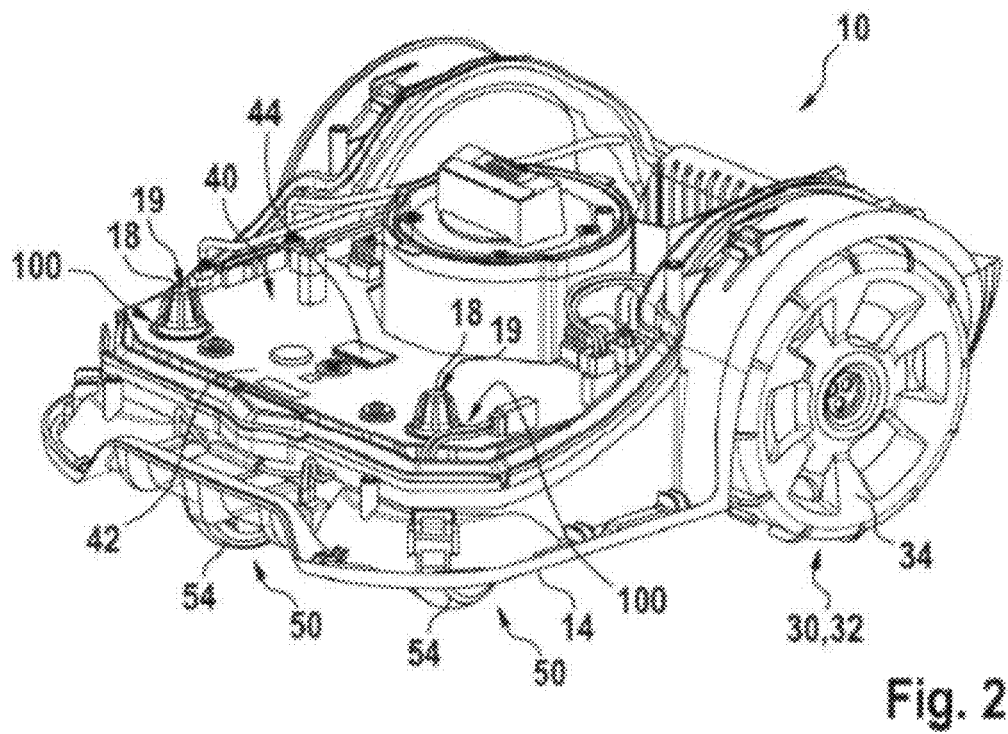
FIG. 2: shows a perspective view of an autonomous floor treatment appliance without a housing cover.

FIG. 2 shows the autonomous ground treatment appliance 10 without the housing cover 11a, as a result of which the arrangement of the sensor unit 100 in the housing 12 is shown. The sensor unit 100 is designed to ascertain the position of a wheel unit 50 relative to a housing 12 of the ground treatment appliance 10. The mower mechanism 20 is designed such that it can be switched off depending on the ascertained position of the wheel unit 50. If the sensor unit 100 ascertains that the wheel unit 50 is not in a retracted state, in particular that the wheel unit 50 is in an extended state, the mower mechanism 20 is switched off.

The sensor unit 100 is associated with the control unit 40. The control unit 40 is designed, in particular, for subjecting the autonomous ground treatment appliance 10 to open-loop control and closed-loop control. By way of example, the control unit 40 is designed to navigate the ground treatment appliance 10 depending on a detected position of the ground treatment appliance 10. The control unit 40 comprises at least one printed circuit board 42 on which at least one microprocessor 44 is arranged.

The running gear 30 has a motor unit 32 which is provided for driving the drive wheel 34. Furthermore, the running gear 30 has a further motor unit 32 which is provided for driving a further drive wheel 34 of the running gear 30. The motor unit 32 and the further motor unit 32 are in the form of electric motors. Furthermore, the motor unit 32 and the further motor unit 32 can be actuated separately from one another by means of a control unit 40a of the autonomous ground treatment appliance 10. Therefore, the running gear 30 forms a differential drive unit. In this case, a steering function is realized by means of a rotation speed difference between the drive wheel 34 and the further drive wheel 34 in a manner which is already known to a person skilled in the art.

The motor unit 32 and the further motor unit 32 are arranged within a housing 12 of the autonomous ground treatment appliance 10. In this case, the motor unit 32 and the further motor unit 32 are each connected to the drive wheel 34 or to the further drive wheel 34 by means of a shaft unit (not illustrated) of the running gear 30. In this case, in each case one of two gear mechanism units (not illustrated) of the running gear 30 is arranged between the drive wheel 34 and the motor unit 32 and, respectively, between the further drive wheel 34 and the further motor unit 32 to achieve a step-up and/or step-down transmission ratio. However, it is also conceivable that the drive wheel 34 and the further drive wheel 34 are each directly connected to the motor unit 32 and, respectively, to the further motor unit 32. The drive wheel 34 and the further drive wheel 34 are each arranged on sides of the housing 12 which are averted from one another.

Figure 3A:
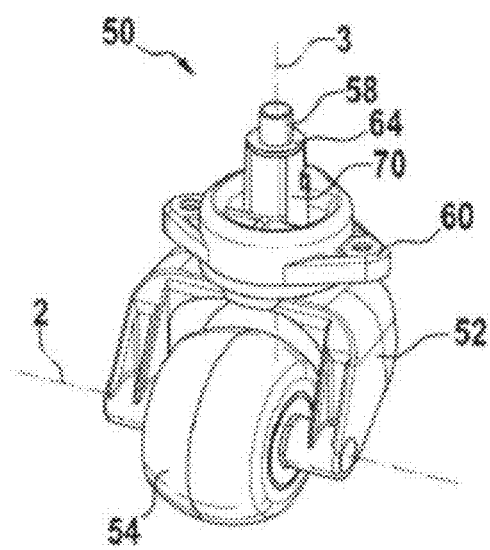
FIG. 3a: shows a perspective view of a wheel unit.
Figure 3B:
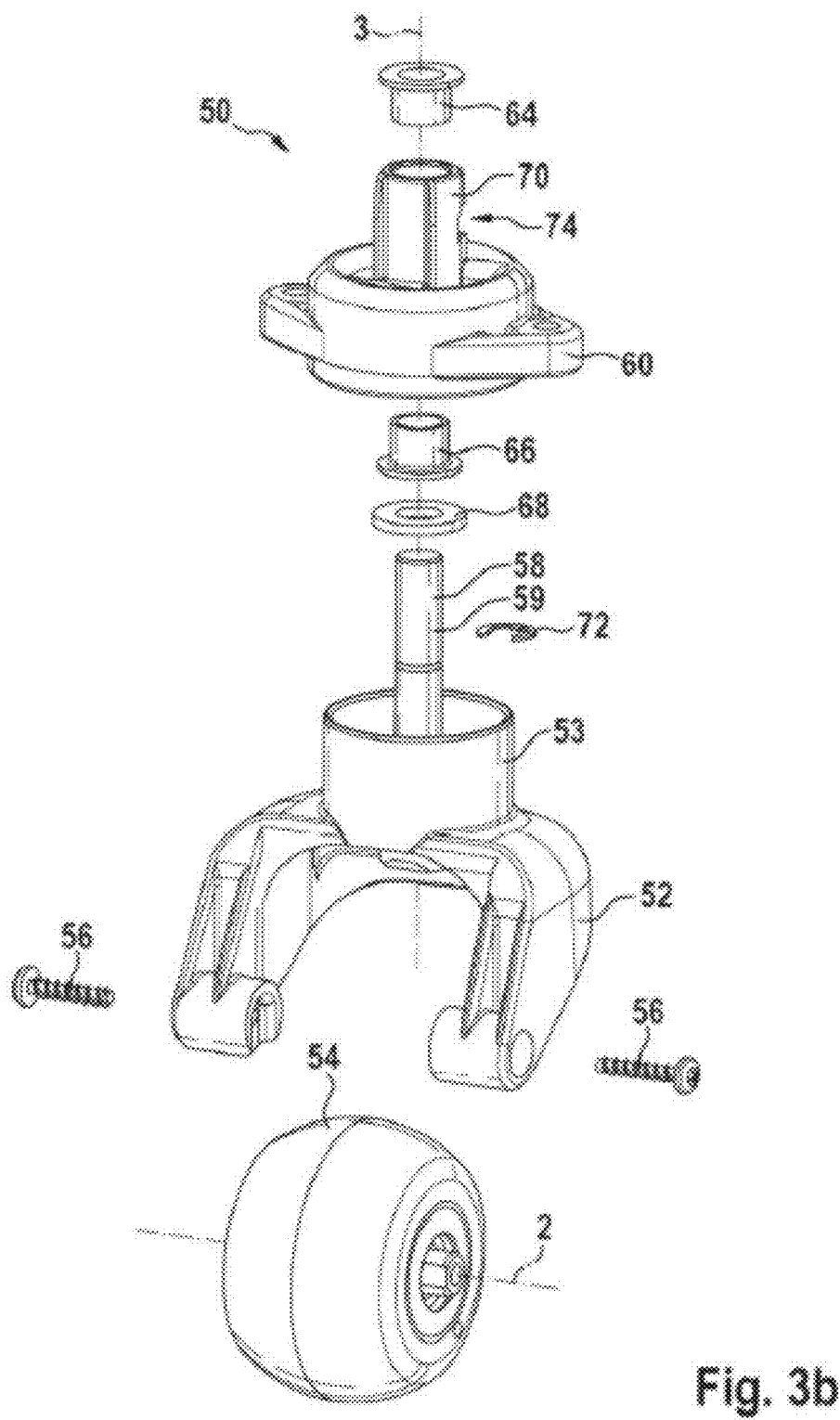
FIG. 3b: shows an exploded drawing of a wheel unit.

In addition to the two drive wheels 34, the autonomous ground treatment appliance 10 additionally has a wheel unit 50 and a further wheel unit 50, which wheel units are arranged on the housing 12 of the ground treatment appliance 10 in an at least partially movable manner and are of substantially identical design. The wheel unit 50 has a support wheel 54 which is mounted so as to rotate about a rotation axis 2 of the wheel unit 50 (see FIG. 3a and FIG. 3b). Furthermore, the wheel unit has a vertical axis 3 which extends perpendicular to the rotation axis 2. The wheel unit 50 is mounted so as to rotate about the vertical axis 3 relative to the housing 12. In addition, the wheel unit 50 is mounted such that it can move in a linear manner along the vertical axis 3 relative to the housing 12. In particular, the wheel unit 50 can assume any desired position between a retracted state (see FIG. 4a) and an extended state (see FIG. 4b) along the vertical axis 3.

The wheel unit 50 has a wheel suspension which is designed such that it can be connected to the support wheel 54 by means of two screws 56. The wheel suspension comprises a main body 52 and a guide rod 58 which extends along the vertical axis 3. The guide rod 58 is connected in a rotationally fixed manner to the main body 52 of the wheel unit 50. The wheel unit 50 is fastened by means of a fastening unit 60, which is of sleeve-like design in sections, to the ground treatment appliance 10, by way of example to the underbody 14 of the housing 12 of the ground treatment appliance 10. The fastening unit 60 is fastened to the ground treatment appliance 10 by means of screws 56 by way of example. The fastening unit 60 has a sleeve-like guide element 70 which partially surrounds the guide rod 58. The guide rod 58 of the wheel unit 50 is mounted so as to rotate and move in a linear manner relative to the housing by means of a first bearing element 64 and a second bearing element 66. The bearing element 64, 66 are, in particular, in the form of sliding bearing elements. The first and the second bearing element 64, 66 are arranged on the fastening unit 60, in particular on opposite end regions of the guide element 70 of the fastening unit 60.

Figure 4A:
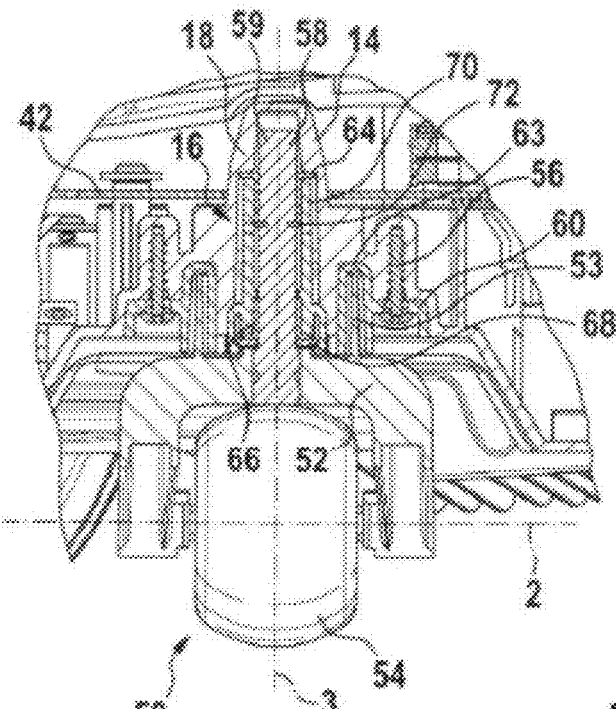
FIG. 4a: shows a cross section of a wheel unit in the retracted state.
Figure 4B:
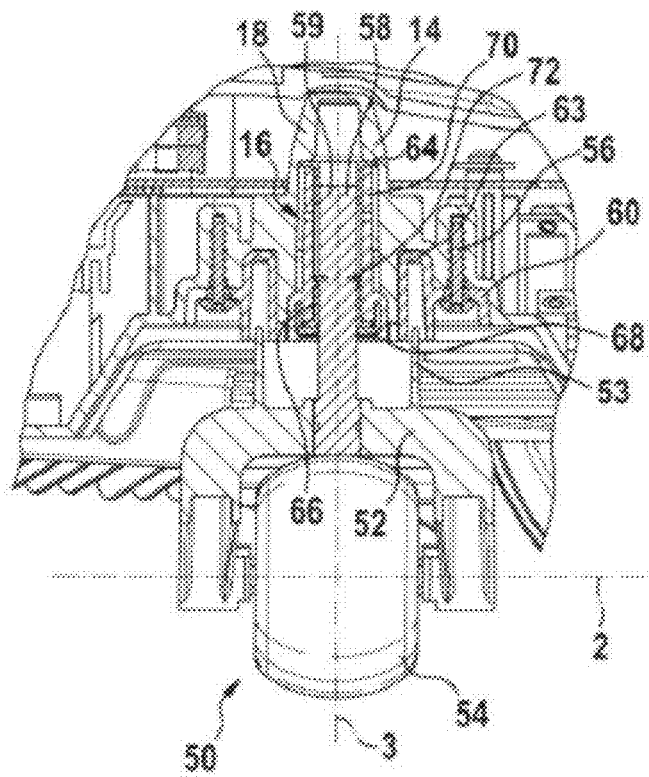
FIG. 4b: shows a cross section of a wheel unit in the extended state.

As shown in FIG. 4a, the first bearing element 64 bears against the sleeve-like guide element 70 of the fastening unit 60 and against the housing 12 of the ground treatment appliance 10, in particular the underbody 14. The second bearing element 66 likewise bears against the guide element 70 of the fastening unit 60 and against a pressure bearing element 68. In the retracted state, the second bearing element 66 bears against the pressure bearing element 68 and the main body 52 bears against the wheel unit 50. In the retracted state, the inherent weight of the ground treatment appliance 10 acts on the wheel unit 50. The pressure bearing element 68 in the form of a pressure bearing disk is designed to ensure rotation of the main body 52 of the wheel unit 50 about the vertical axis 3 in the retracted state.

The guide rod 58 is mounted axially along the vertical axis 3 at least partially by means of a circlip element 72. The circlip element 72 can be fastened to the guide rod 58 by means of a recess 74 in the wall of the guide element 70. In the extended state (see FIG. 4b), the second bearing element 66 is acted on by the circlip 72 in such a way that the main body 52 of the wheel unit 50 is secured against becoming lost.

The main body 52 of the wheel unit 50 has a circular collar 53 which is arranged in a movable manner in a circular groove 63 of the fastening unit 60. In the retracted state, the circular collar 53 can be substantially completely accommodated by the circular groove 63. The rigidity of the wheel unit 50 is advantageously increased by the arrangement of the circular collar 53 in the groove 63. The first and the second bearing element 64, 66 and the fastening unit 60 are preferably formed from a plastic.

Figure 5:
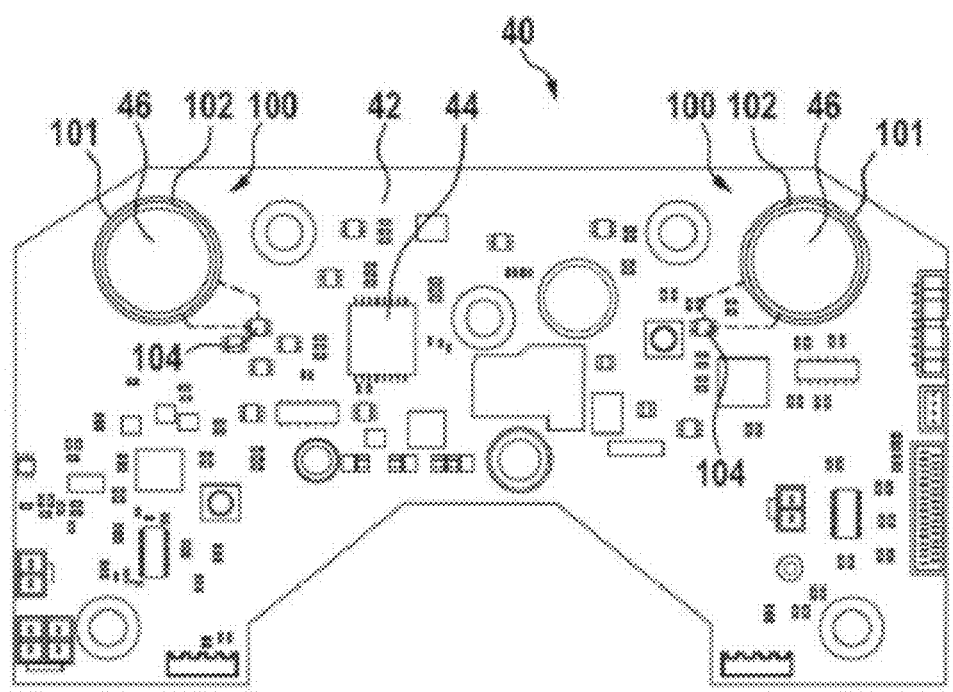
FIG. 5: shows a plan view of a printed circuit board with a sensor unit.

The sensor unit 100 is designed to ascertain the position of the signal transmitter element 59 and has a sensor element 101 in the form of a sensor coil 102. The signal transmitter element 59 is, by way of example, in the form of the guide rod 58. As is shown in FIG. 5, a first sensor unit 100 and a second sensor unit 100 can be integrated in the printed circuit board 42 of the control unit 40. The sensor coil 102 is formed by conductor tracks which are arranged, in particular embedded, in the inner layers of the printed circuit board 42. Therefore, the sensor coil 102 is protected against dirt and moisture and against mechanical damage. The sensor coil 102 is arranged, in particular, concentrically about a recess 46 in the printed circuit board 42. The sensor coil 102 is part of a resonant circuit comprising an amplifier 104 which is designed to excite the resonant circuit in a resonant manner. The sensor unit 100 measures the amplitude of the oscillation and automatically regulates the actual value of the oscillation at a setpoint value of the oscillation by means of the amplifier 104 in order to keep the oscillation constant. Furthermore, the sensor unit 100 is designed to detect a characteristic variable which represents the energy which is required in order to maintain the resonant circuit. This state variable can be used to ascertain how much energy is absorbed by the resonant circuit, from which a resistance value or Rp value which corresponds to the resistive component in the resonant circuit can be ascertained.

The resistive component in the resonant circuit is in the form of a signal transmitter element 59 which is, by way of example, in the form of the guide rod 58 of the wheel unit 50, wherein the guide rod 58 is composed of a magnetoresistive material. The guide rod 58 is arranged in a movable manner relative to the housing 12 in the recess 46 of the printed circuit board 42 (see FIG. 4a and FIG. 4b). In particular, the guide rod 58 is the only magnetoresistive component which is arranged in the recess 46. In the retracted state of the wheel unit 50, the guide rod 58 passes through the recess 46. In the extended state, the guide rod 58 is arranged outside the recess 46, advantageously below the recess 46. In the retracted state of the wheel unit 50, the guide rod 58 is advantageously arranged in the operative region of the sensor unit 100 in such a way that the energy for maintaining the resonant circuit differs from the energy which is required in the extended state for maintaining the resonant circuit. By virtue of ascertaining the resistance value or the Rp value, the sensor unit 100 can ascertain whether the wheel unit is in a retracted or extended state. It is likewise conceivable that the sensor unit 100 detects only one characteristic variable in respect of the energy required for maintaining the resonant circuit and the control unit 40 ascertains the resistance value and ascertains the state of the wheel unit 50.

Figure 6A:
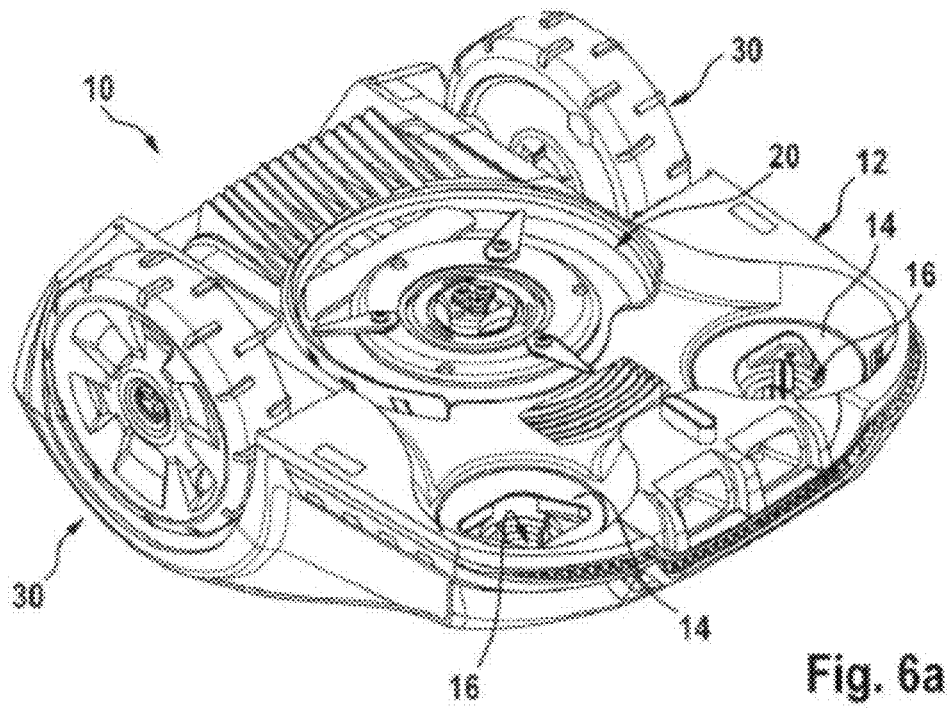
FIG. 6a: shows a perspective view of an autonomous floor treatment appliance without a wheel unit.
Figure 6B:
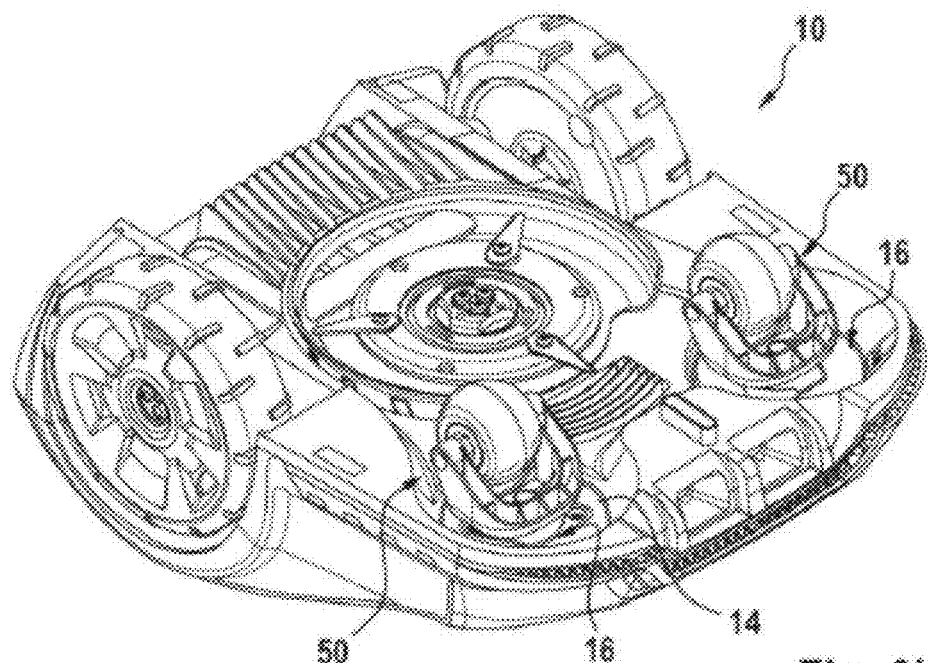
FIG. 6b: shows a perspective view of an autonomous ground treatment appliance with a wheel unit.

Since electrical components of the sensor unit 100 and of the control unit 40, such as a microprocessor 44 and the amplifier 104 for example, are located on the printed circuit board 42, the printed circuit board 42 is designed such that it is advantageously protected against the ingress of dirt and moisture with the aid of a seal element 18. FIG. 6 shows the bottom side of the ground treatment appliance 10 with a wheel unit 50 removed. FIG. 6b shows bottom side according to FIG. 6a with the wheel unit 50 fitted. The pocket 16 for accommodating the wheel unit 50 is advantageously designed in such a way that ingress of dirt and moisture into the interior of the housing 12 is prevented. The pocket 16 is arranged in the underbody 14 of the housing 12 and has, in particular, no passage opening into the interior of the housing 12. The pocket 16 of the underbody 14 is in particular shaped in such a way that the wall of the pocket 16 protrudes through the recess 46 in the printed circuit board 42 in such a way that a seal element 18 in the form of a protuberance 19 is formed (see FIG. 4a) and as a result a separating wall between the interior of the housing and the exterior of the housing is formed. In the state in which the wheel unit 50 is fastened to the housing 12 of the autonomous ground treatment appliance 10, the guide rod 58 is arranged in a movable manner in the protuberance 19.

Figure 7:
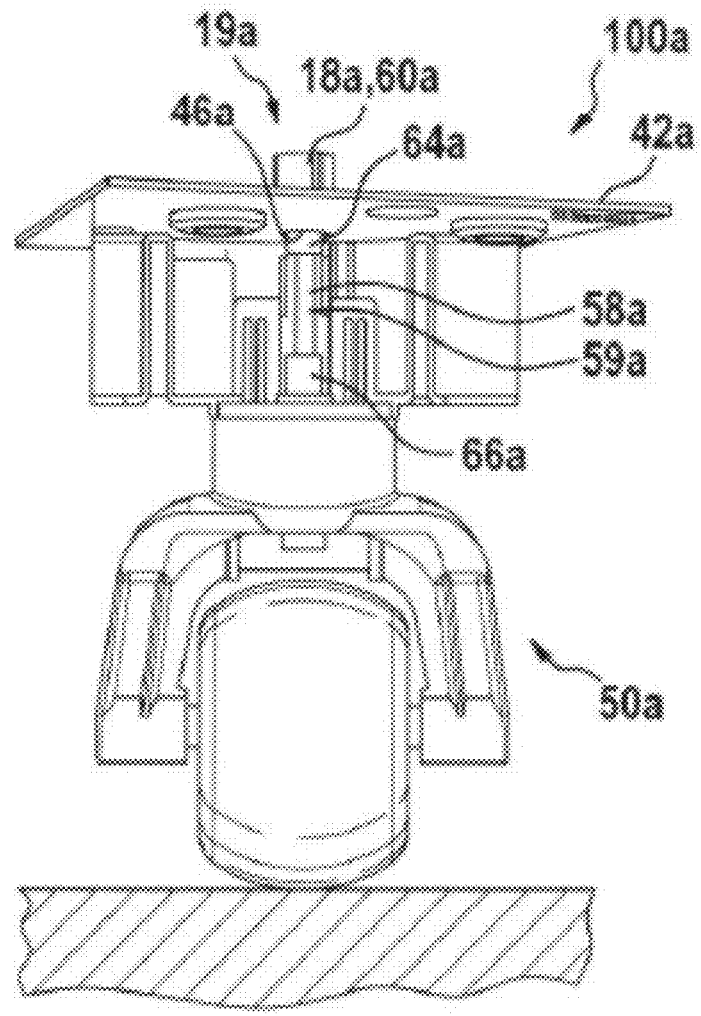
FIG. 7: shows a perspective view of an alternative embodiment of the printed circuit board.

FIG. 7 shows an alternative embodiment of the printed circuit board 42a. The sensor unit 100a is arranged on an additional, separate printed circuit board 42a which can be connected to the printed circuit board (not shown) of the control unit by means of electrical contact elements. The sensor unit 100a likewise comprises a sensor element in the form of a sensor coil (not shown) which is designed to ascertain the position of a signal transmitter element 59a which is in the form of a guide rod 58a of the wheel unit 50a. In this embodiment, the fastening unit 60a is in the form of a seal element 18a. The fastening unit 60a is designed to fasten the printed circuit board 42a to the wheel unit 50a. The fastening unit 60a is advantageously shaped in such a way that it protrudes, as a closed wall, into the recess 46a of the printed circuit board 42*a* and forms a protuberance 19*a* in which the guide rod 58*a* of the wheel unit 50*a* is arranged in a movable manner.

Figure 8A:
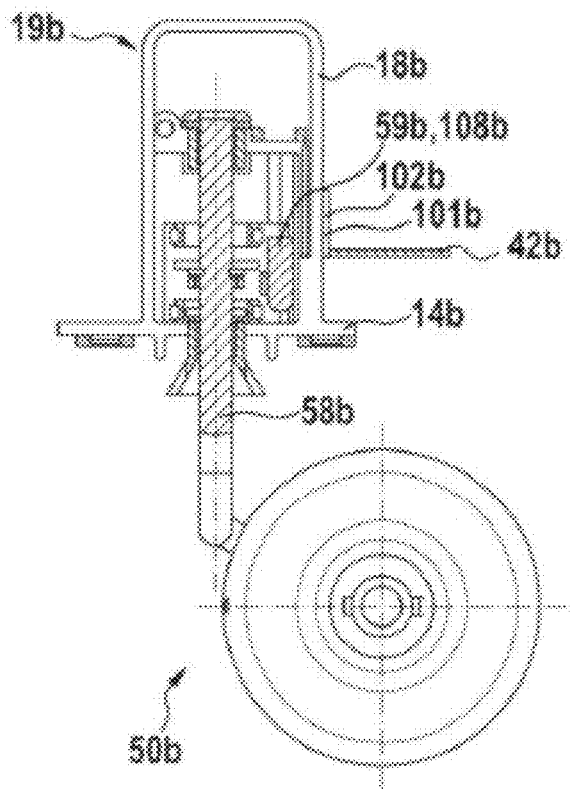
FIG. 8a: shows a perspective view of a further alternative embodiment of the sensor unit.
Figure 8B:
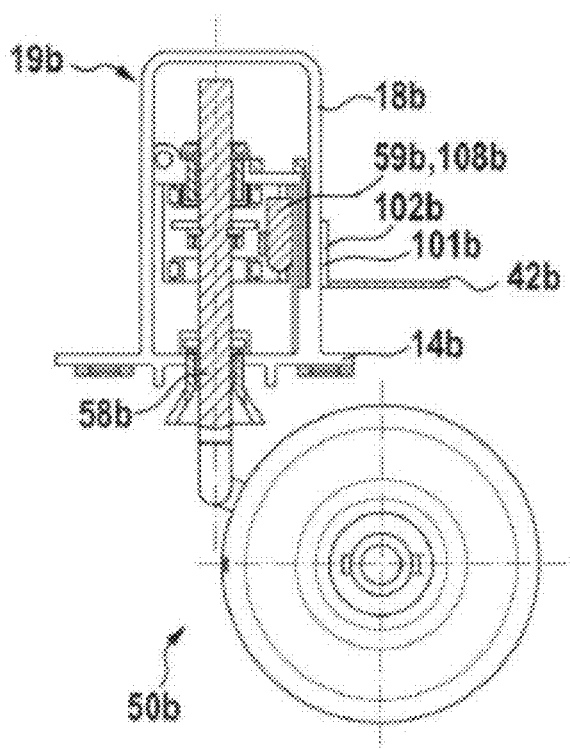

FIG. 8*a* and FIG. 8*b* show a further alternative embodiment of the sensor unit 100*b*. The sensor unit 100*b* comprises a sensor element 101*b* in the form of a Hall sensor 102*b* which is arranged on a printed circuit board 42*b*. The printed circuit board 42*b* can be in the form of a component of the control unit 40*b*. The Hall sensor 102*b* is advantageously designed to detect the position of the wheel unit 50*b*. The movement of the guide rod 58*b* of the wheel unit 50*b* is coupled to the movement of a signal transmitter element 59*b*, wherein the position of the signal transmitter element 59*b* can be ascertained by the Hall sensor 102*b*. The signal transmitter element 59*b* is, by way of example, in the form of a magnet 108*b*. The movably mounted guide rod 58*b* is advantageously encased by a seal element 18*b* in such a way that no dirt or no moisture can reach the Hall sensor 102*b*. The seal element 18*b* is advantageously formed by the underbody 14*b* of the housing 12*b* of the autonomous ground treatment appliance 10*b* in the form of a protuberance 19*b*.

What is claimed is:

1. An autonomous ground treatment appliance, comprising:
    a housing;
    a running gear;
    a printed circuit board;
    a control unit configured to control the appliance;
    at least one wheel unit mounted on the housing so as to be at least partially movable relative to the housing between a retracted state and an extended state; and
    a sensor unit with at least one sensor element, the sensor unit (i) at least partially positioned on or at least partially integrated into the printed circuit board and (ii) configured to ascertain a position of the at least one wheel unit in the retracted state and the extended state, wherein the at least one sensor element is a sensor coil extending concentrically about a recess in the printed circuit board.

2. The autonomous ground treatment appliance of claim 1, wherein the printed circuit board is a component of the control unit.

3. The autonomous ground treatment appliance of claim 1, wherein the sensor coil forms at least a part of a resonant circuit.

4. The autonomous ground treatment appliance of claim 1, wherein the sensor unit is further configured to ascertain a position of a signal transmitter element.

5. An autonomous ground treatment appliance, comprising:
    a housing;
    a running gear;
    a control unit configured to control the appliance;
    at least one wheel unit mounted on the housing so as to be at least partially movable relative to the housing;
    a sensor unit configured to ascertain a position of the at least one wheel unit relative to the housing, the sensor unit including at least one sensor element in the form of a sensor coil; and
    a printed circuit board that includes a recess, the sensor coil positioned concentrically about the recess.

6. The autonomous ground treatment appliance of claim 5, further comprising a signal transmitter element configured to partially move relative to the recess of the printed circuit board, the sensor unit further configured to ascertain a position of the signal transmitter element.

7. The autonomous ground treatment appliance of claim 6, wherein the signal transmitter element is a magnetoresistive element.

8. The autonomous ground treatment appliance of claim 6, wherein the signal transmitter element includes a guide rod.

9. The autonomous ground treatment appliance of claim 6, further comprising:
    a further wheel unit that includes a further signal transmitter element; and
    a further sensor unit configured to ascertain a position of the further signal transmitter element, the further sensor unit at least partially positioned on or integrated into the printed circuit board.

10. The autonomous ground treatment appliance of claim 1, further comprising a seal element configured to at least partially seal off the sensor unit against moisture, at least a portion of the seal element integrally formed with the housing.

11. The autonomous ground treatment appliance of claim 10, wherein the seal element includes at least one protuberance.

12. The autonomous ground treatment appliance of claim 11, wherein the at least one protuberance protrudes through the recess and intersects a plane defined by the printed circuit board.

13. The autonomous ground treatment appliance of claim 10, further comprising a signal transmitter element configured to partially move, in the protuberance, relative to the recess of the printed circuit board, the sensor unit further configured to ascertain a position of the signal transmitter element.

14. The autonomous ground treatment appliance of claim 1, wherein the appliance is a robotic lawnmower.

15. An autonomous ground treatment appliance, comprising:
    a housing;
    a running gear;
    a control unit configured to control the appliance;
    at least one wheel unit mounted on the housing so as to be at least partially movable relative to the housing;
    a sensor unit configured to ascertain a position of the at least one wheel unit relative to the housing, the sensor unit including at least one sensor element in the form of a sensor coil;
    a printed circuit board that includes a recess, the sensor coil positioned concentrically about the recess; and
    a signal transmitter element configured to partially move relative to the recess of the printed circuit board,
    wherein the signal transmitter element is a magnetoresistive element and the sensor unit is configured to ascertain a position of the magnetoresistive element.

* * * * *

UNITED STATES PATENT AND TRADEMARK OFFICE
CERTIFICATE OF CORRECTION

| | |
|---|---|
| PATENT NO. | : 10,549,646 B2 |
| APPLICATION NO. | : 15/636953 |
| DATED | : February 4, 2020 |
| INVENTOR(S) | : David Reynolds et al. |

It is certified that error appears in the above-identified patent and that said Letters Patent is hereby corrected as shown below:

On the Title Page

At "(72)" for inventor David Reynolds, please insert the words --Bury Saint-- immediately before the word "Edmunds".

At "(72)" for inventor Gavin Ben Armstrong, please delete the word "Suffork".

At "(72)" for inventor Martin Bolton, please delete the word "Suffolk" and replace it with the words --Bury Saint Edmunds--.

At "(72)" for inventor Philip Tonks, please delete the word "Suffolk" and replace it with the word --Stowmarket--.

Signed and Sealed this
Twenty-first Day of April, 2020

Andrei Iancu
*Director of the United States Patent and Trademark Office*